July 20, 1937.                    J. KING                    2,087,670
GUIDE FOR SLIDING PANELS, PARTICULARLY SLIDING ROOFS FOR MOTOR VEHICLES
Filed July 23, 1936
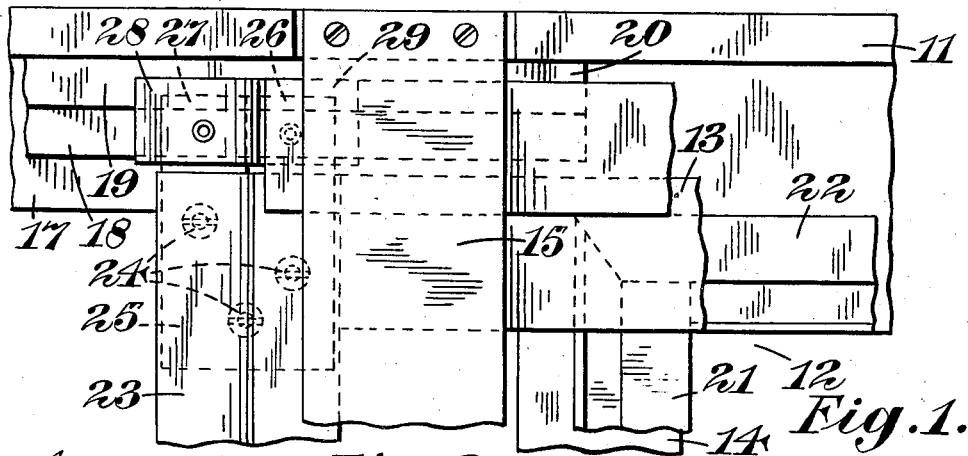
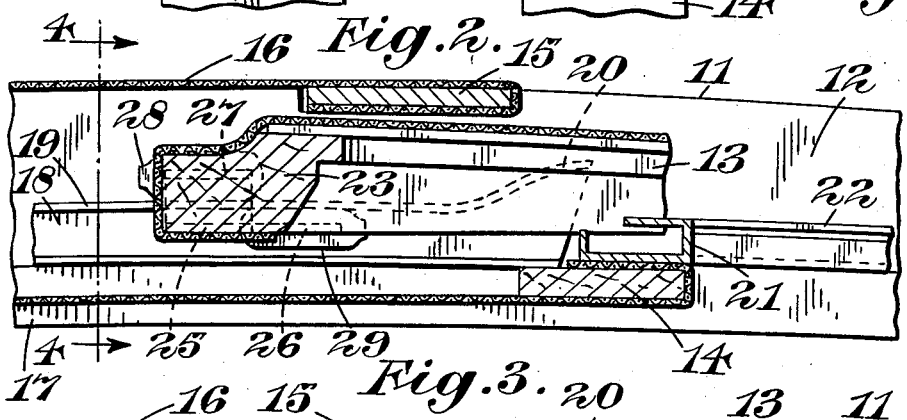
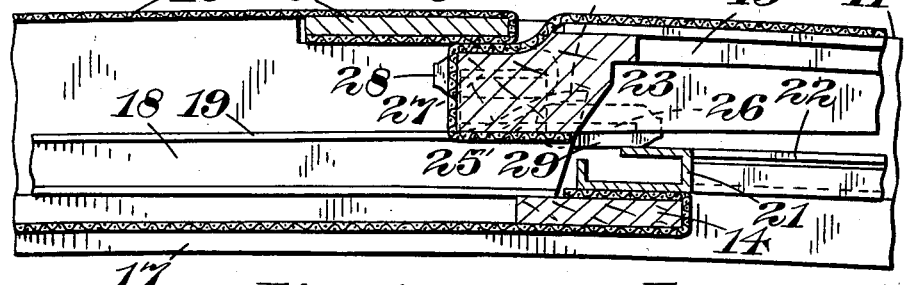
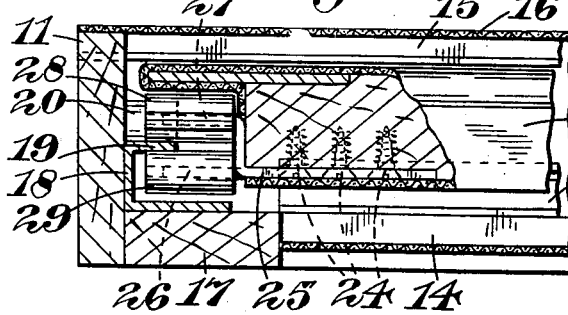
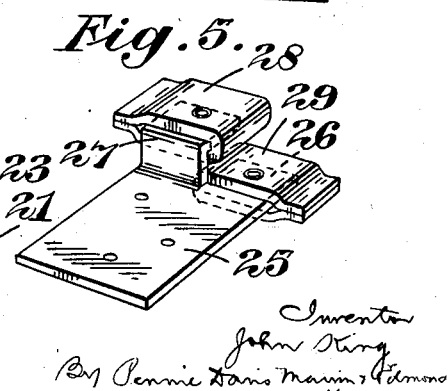

Patented July 20, 1937

2,087,670

UNITED STATES PATENT OFFICE 2,087,670

GUIDE FOR SLIDING PANELS, PARTICULARLY SLIDING ROOFS FOR MOTOR VEHICLES

John King, London, England

Application July 23, 1936, Serial No. 92,072
In Great Britain July 4, 1935

3 Claims. (Cl. 296—137)

This application corresponds to the application of John King, Serial No. 19148/35, which was filed in Great Britain on July 4, 1935.

This invention comprises improvements in or relating to guides for sliding panels, particularly sliding roofs for motor vehicles.

It is known to provide a sliding roof for a motor vehicle with a panel which runs on metal channel section or like runways which are so shaped that when the roof reaches the closed position the sliding panel can be lifted so as to come up flush with a fixed panel beneath which up to that moment it had been sliding. This construction necessitates that the guides on which the roof runs should either be bent upward permanently or should be flexible so that they can accommodate themselves to the upward movement. In the latter case some form of cam device is necessary in order to push the roof upwardly. In the former case the upward bend of the runway itself may act as the cam or ramp. The present invention relates to a sliding roof for a motor vehicle or like panel of the kind described.

The means for guiding the sliding panel upon the runways must therefore be capable of engagement with the runways not only along the substantially straight horizontal portion thereof but also at the upturned portion, and it has previously been proposed in United States Patent No. 2,007,865 to connect the sliding panel to the runway by means of pivoted runners which are free to turn so that they keep parallel with the section of the runway with which they are engaged. The present invention offers an alternative construction to the pivoted runners.

The present invention comprises in a motor vehicle sliding roof or like panel of the kind described, the combination with the sliding panel, and fixed runways having upper and lower guiding surfaces for guiding the rear edge thereof, of runners fixed to the sliding panel each of which is provided with two abutments to engage, one the upper and the other the lower of the guiding surfaces of the runway, the two abutments being displaced relatively to one another along the runway so that they do not lie directly one over the other and the space between the abutments at their point of nearest approach being such as to permit of the necessary angular deviation of the runway at the point where the panel is lifted flush with the fixed portion of the roof.

One construction in accordance with the invention is illustrated by way of example in the accompanying drawing, in which:—

Figure 1 is a plan showing a portion of a sliding panel and runways of a roof with the fabric coverings removed so that the working parts may be seen;

Figure 2 is a longitudinal section through the parts illustrated in Figure 1, but showing the coverings of the panels in place, the sliding panel of the roof being partly retracted;

Figure 3 is a view similar to Figure 2 but showing the sliding panel fully drawn forward to its closed position;

Figure 4 is a transverse section upon the line 4—4 of Figure 2 looking in the direction of the arrows;

Figure 5 is a detail.

Referring to Figures 1 and 2, 11 represents the upper edge of the cant rails at the sides of the roof between which there is an opening 12 in which works a sliding panel 13. The opening 12 is spanned by a cross member 14 beneath the sliding panel, which cross member forms the rear edge of the part of the opening 12 which is closed by the sliding panel when the latter is fully drawn forward. Above the sliding panel 13 there is another thin metal cross member 15 around which is stretched fabric 16 which forms a fixed panel closing in the rear portion of the roof. Side members 17 extend longitudinally beneath the fixed panel 16 at a lower level than the sliding panel 13 and support inwardly facing channel members 18 as best seen in Figure 4. The channel members 18 have inwardly projecting upper flanges 19 which constitute runways having upper and lower guiding surfaces and, as will be seen from Figure 2, the runways 19 are curved upwardly as indicated at 20 at their front end, just in front of and beneath the cross member 15.

The opening beneath the sliding panel which is terminated by the cross member 14 is surrounded by an upstanding tray 21 of channel section material which serves as a drainage channel to catch any rain which may leak in through the sides of the sliding panel 13. The sides of the tray 21 which run parallel to the direction of movement of the sliding panel 13 have flanges 22 which constitute runways for supporting the front end of the panel. The panel 13 engages with these runways 22 by the usual sliding elements and locking devices, which are not shown in the drawing.

The rear edge of the panel 13 is constituted by a cross member 23 and to this is secured at each corner, by screws 24, a bracket 25 forming part of a runner (shown in detail in Figure 5) for working on one of the runways 19. The runner consists of the flat plate portion 25 and two projecting lugs 26, 27 at the end of the plate 25. The lug 26 is in the same plane as the plate 25 and the lug 27 is bent upwardly and then again bent so as to lie parallel with the plate 25 but at a higher level. The two lugs 26, 27 are covered with sheet vulcanized fibre pads 28, 29 which are riveted in place.

As can be seen from the drawing the lower face of the upper pad 28 lies in a plane which is slightly above the upper face of the lower pad 29, the distance between these two faces in a vertical direction being equal to the thickness of the runway flange 19. The runner is screwed, as best seen in Figure 4, to the end of the cross member 23 so that the lugs 26, 27 lie respectively beneath and above the flange of the runway 19 and the vulcanized fibre pads 28, 29 fit the flange of the runway without any shake or looseness. Owing to the fact, however, that the two pads are not directly over one another, the lowermost pad 29 being further forward than the upper pad 28, the two pads are able to accommodate the bend 20 at the front end of the runway 19 and to permit the panel 13 to rise up the runway when it is moved forward into the position shown in Figure 3, where the panel is closed. The panel 13 in this position is lifted by the bend 20 of the runway so as to be flush on its upper surface with the fixed panel 16 and this is accomplished without having any moving parts to the runner 25 and without permitting any undesirable play in an up or down direction when the runner is engaging the horizontal portion of the runway 19. Consequently the roof does not rattle at intermediate positions of its movement and there are no loose or movable parts to require careful fitting or increase the cost of construction.

Felt or other soft material could be used instead of vulcanized fibre for the pads 28, 29. In any case a non-metallic material is preferable to metal in these parts, as metal would tend to rattle unless very well fitted. Although the invention has been illustrated in the drawing as applied to that particular construction where the front ends of the runways form rigid ramps 20, the invention is equally applicable to cases where the ramps for lifting the panel 13 flush with the fixed portion 16 of the roof are separate from the runways 19 and the front ends of the runways are merely bent or made flexible in order to conform with the shape of the ramps.

The channel-shaped runways 19 may be reversed so as to face outwardly if desired, the runners being modified to correspond.

Although the terms "upper" and "lower" are used in the claims to describe the faces of the runway and the panels are said to be "lifted", it will be understood that these expressions are used in a relative sense. The invention may be employed for a sliding panel which is vertical, in which case the position of all the parts will still be relatively similar to that of the horizontal roof herein described.

I claim:—

1. The combination with a sliding panel, a fixed panel behind which the sliding panel is adapted to slide, and fixed runways having upper and lower guiding surfaces for guiding the rear edge of the sliding panel, which guiding surfaces are curved upwardly adjacent their forward ends to lift the sliding panel flush with the fixed panel when fully withdrawn therefrom, of runway-engaging means fixed to the sliding panel, said runway engaging means having an upper and a lower abutment mounted substantially immovably with respect to the sliding panel for engaging respectively with the upper and lower guiding surfaces of the runway, the abutment adapted to engage with the upper guiding surface of the runway being displaced to the rear with respect to the abutment adapted to engage with the lower surface of the runway, in such manner that the abutments bear against the upper and lower surfaces respectively of both the straight and curved sections of the runway when the sliding panel is moved therealong.

2. The combination with a sliding panel, a fixed panel behind which the sliding panel is adapted to slide, and fixed runways having upper and lower guiding surfaces for guiding the rear edge of the sliding panel, which guiding surfaces are curved upwardly adjacent their forward ends to lift the sliding panel flush with the fixed panel when fully withdrawn therefrom, of runway-engaging means fixed to the sliding panel, said runway-engaging means having an upper and a lower abutment mounted substantially immovably with respect to the sliding panel and each abutment having a flat surface for engaging respectively with the upper and lower guiding surfaces of the runway, the abutment adapted to engage with the upper guiding surface of the runway being displaced to the rear with respect to the abutment adapted to engage with the lower surface of the runway, in such manner that the abutments bear against the upper and lower surfaces respectively of both the straight and curved sections of the runway when the sliding panel is moved therealong.

3. The combination with a sliding panel, a fixed panel behind which the sliding panel is adapted to slide, and fixed runways having upper and lower guiding surfaces for guiding one end of the sliding panel, which guiding surfaces are curved to lift the sliding panel flush with the fixed panel when fully withdrawn therefrom, of runway-engaging means fixed to the sliding panel and including two abutments mounted substantially immovably with respect to the sliding panel, said abutments adapted to engage, one the upper and the other the lower of the guiding surfaces of the runway, said abutments snugly receiving the fixed runway when the sliding panel is moved to disengage the abutments from the curved portion of the runway, the two abutments being displaced relatively to one another along the runway, with the abutment adapted to engage the upper guiding surface being displaced to the rear with respect to the abutment adapted to engage the lower guiding surface, and the space between the abutments at their point of nearest approach being such as to permit of the necessary angular deviation of the runway at the point where the sliding panel is lifted flush with the fixed panel.

JOHN KING.